Patented Jan. 5, 1937

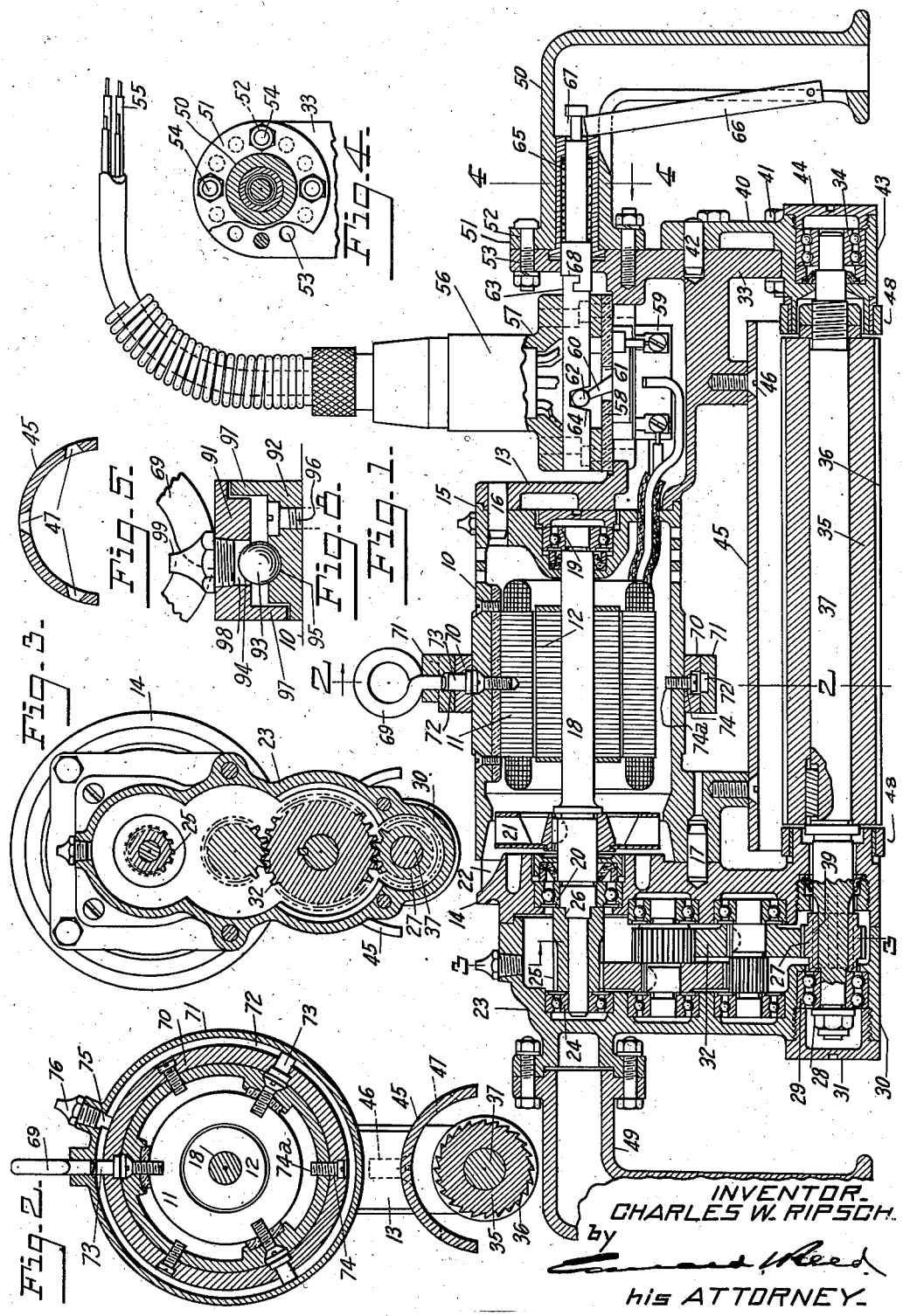

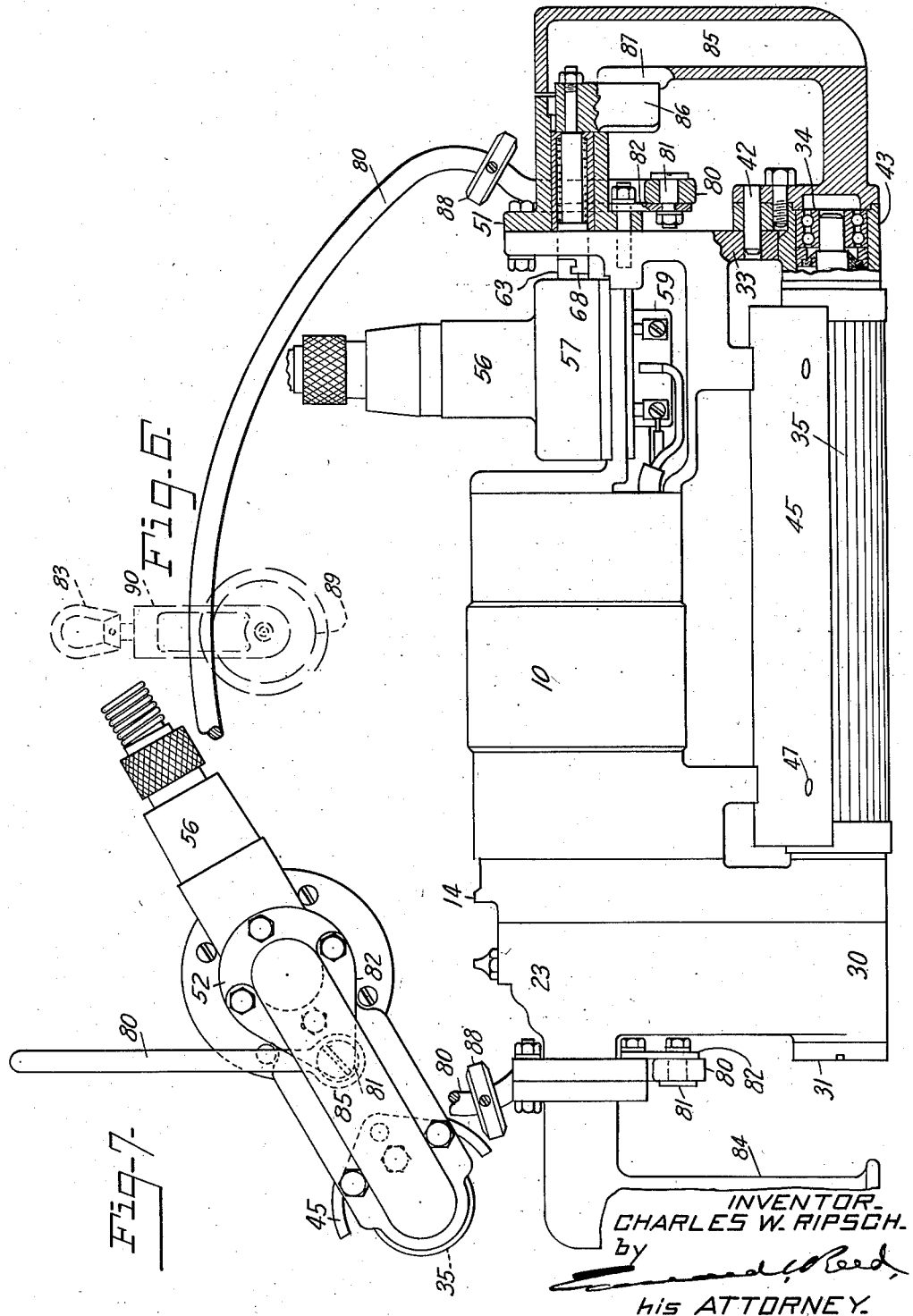

2,066,741

UNITED STATES PATENT OFFICE 2,066,741

POWER OPERATED PORTABLE TOOL

Charles W. Ripsch, Dayton, Ohio, assignor to The Buckeye Portable Tool Company, Dayton, Ohio, a corporation of Ohio Application September 10, 1935, Serial No. 39,977

10 Claims. (Cl. 29—76)

This invention relates to a power operated portable tool and more particularly to such an apparatus which is designed for dressing or finishing surfaces, as by cutting, filing, polishing or the like.

One object of the invention is to provide an apparatus of this kind which can be easily manipulated by the operator; and to this end it is also an object of the invention to provide such an apparatus which may be suspended from a support and, while so suspended, rocked about a longitudinal axis.

A further object of the invention is to provide such an apparatus which, when suspended from a support, will be substantially balanced about a transverse axis.

A further object of the invention is to provide such an apparatus which can be easily operated on surfaces which are inaccessible to the ordinary apparatus of this kind. For example, in some automobile bodies the top surfaces are curved inwardly so as to form in effect longitudinal depressions or channels and some of the welded joints extend across these depressions. The welding of the joints often causes a slight distortion of the edges of the metal and in order to secure a smooth surface the welded joints are filled with solder and then dressed down to a smooth surface. The ordinary power operated tool cannot be applied to the joints in the longitudinal depressions and it has been customary to dress these joints by hand. The present apparatus is especially designed for operating in such a depression.

A further object of the invention is to provide a support for the apparatus which will permit the same to be rocked about a longitudinal axis, and which can be easily assembled and attached to the apparatus.

A further object of the invention is to provide such an apparatus in which the tool or finishing element may be quickly and easily removed from and inserted in the apparatus, thus enabling tools of different kinds to be used interchangeably.

A further object of the invention is to provide such an apparatus which will be simple in construction and durable in character, thus enabling the same to be manufactured and maintained at a low cost.

Various other objects of the invention will appear as the apparatus is described in detail.

In the accompanying drawings Fig. 1 is a longitudinal sectional view taken centrally through an apparatus embodying the invention and partly broken away; Fig. 2 is a transverse section taken on the line 2—2 of Fig. 1; Fig. 3 is a transverse section taken on the line 3—3 of Fig. 1; Fig. 4 is a detail view, partly broken away, of the adjustable connection between one of the handles and the frame; Fig. 5 is a sectional detail view of the chip guard; Fig. 6 is a side elevation of the apparatus, partly in section, showing a modified form of supporting device; Fig. 7 is an end elevation of the apparatus shown in Fig. 6; and Fig. 8 is a sectional view of a slightly modified form of the swiveled support of Fig. 1.

In these drawings I have illustrated one embodiment of my invention, together with a minor modification, and have shown the same as equipped with a rotary cutter designed particularly to remove the solder from the joints as above described but it will be understood that this embodiment has been chosen for the purposes of illustration only, and that the apparatus may take various forms and may be equipped with tools or finishing elements of various kinds to accommodate the same to the particular work to be done. I have also shown this particular apparatus as equipped with an electric motor but an air motor or other suitable power unit may be substituted for the electric motor without substantially changing the construction of the apparatus.

In the particular embodiment here illustrated the motor is built into the apparatus and the casing thereof constitutes a part of the main frame of the apparatus. The motor casing 10 is substantially cylindrical in form and encloses the stator 11 and rotor 12, which are of ordinary construction. Connected with each end of the motor casing are end members 13 and 14 of the main frame. These end members are rigidly secured to the motor casing and, as here shown, the casing and end members are provided with interlocking joints, or annular dowels, as shown at 15, to accurately center the end members with relation to the casing, and are also provided with dowel pins 16 and 17 to accurately position the end members about the axis of the motor casing.

The rotor shaft 18 is mounted at one end in a bearing 19 formed in the motor casing itself and is supported at its other end in a bearing 20 in the end member 14. A fan 21 is mounted on the motor shaft within the casing and the peripheral portion of the end member 14 is cut away at intervals, as shown at 22, to permit the circulation of air between the end member and the casing. The end member 14 includes a detachable portion 23 which is rigidly secured thereto and which constitutes a gear housing.

A bearing 24 is mounted in the upper portion of this gear housing and a pinion 25 is supported at one end by the bearing 24 and is connected at its other end with the motor shaft 18. The connection between the pinion and the motor shaft is preferably a detachable one and is here shown as comprising interlocking clutch jaws 26 which will permit the pinion to be withdrawn from the motor shaft when the gear housing is removed.

The end member 14, including the gear housing, extends beyond and is laterally offset with relation to the motor casing and a bearing 29 is mounted in the offset portion thereof. This offset portion is preferably cylindrical, as shown at 30, and is closed at its outer end by a screw cap 31 which affords access to the bearing and the end of the shaft mounted therein. The end member 13 extends longitudinally from the motor casing and is provided at its outer end with a laterally offset portion 33 in which is mounted a bearing 34 arranged in axial alinement with the bearing 29. A finishing element or tool is mounted between the end members 13 and 14 for rotation about an axis extending lengthwise of the main frame and is thus supported alongside of and in laterally spaced relation to the motor casing. This tool may be of any suitable character but it is here shown as a cutter 35 which is cylindrical in form and is provided with a circumferential series of longitudinal blades or cutting teeth 36. This cylindrical cutter is supported by a shaft 37 which, in the present instance, is separate from but rigidly secured to the cutter itself. The cutter shaft 37 is supported at one end in the bearing 34 and at its other end in the bearing 29, in which it is retained by a nut 28. Mounted on the shaft between the bearing 29 and the cutter is a gear 27 which preferably is detachably secured to the shaft, as by interlocking clutch jaws 39 which may be separated by the longitudinal movement of the shaft. The gear 27 is connected with the pinion 25 by a train of reducing gears 32 to cause the cutter to be rotated by the motor at a reduced speed. The gear ratio and hence the speed may be varied by detaching the gear housing and making the necessary changes in the gears. That part of the offset portion 33 of the end member 13 in which the bearing 34 is mounted is preferably detachable from the body of the end member so that it can be readily removed to release the adjacent end of the tool, which may then be withdrawn from the bearing 29 and gear 27 by first removing the nut 28. In the construction here shown this detachable part comprises a plate 40 rigidly connected with the outer end of the member 13 by screws 41 and held accurately in position by a dowel pin 42. Formed integral with the lower portion of the plate 40 is a cylindrical portion 43 in which the bearing 34 is mounted and the outer end of which is closed by a screw cap 44.

As has been stated, the apparatus may be provided with various types of tools for performing various kinds of work and with some types of tool it is preferable to support the tool at one end only so as to leave the other end thereof unobstructed and thus permit the working surface of the tool to be renewed from time to time, as, for example, when the tool comprises a sleeve of emery cloth which must be renewed at more or less frequent intervals. When it is desired to so support the tool the detachable part 40—43 of the end member 13 and the bearing 34 may be removed.

The apparatus is also shown as provided with a chip or dust guard 45 which is here shown as substantially semi-circular in cross section and rigidly secured to the main frame in such a manner that it extends approximately half way about the tool. It is here shown as extending about the upper half of the tool but under some conditions it may be preferable to have it extend about one or the other of the lateral portions of the tool and means are therefore provided for adjustably connecting the same with the frame. In the present construction the guard is secured to the frame by screws 46 and it is provided at each end with a series of screw holes 47 any one of which will receive the screw 46. Thus the position which the guard occupies with relation to the cutter or other tool is determined by the selection of the screw holes which are used in attaching the same to the frame.

In order to prevent the ends of the cutters from accidentally contacting with the surface on opposite sides of the joint which is being finished guards 48 are arranged at the respective ends of the cutter and, as here shown, these guards are annular in form and are rotatably mounted on the adjacent portions of the two end members, each guard being of a diameter slightly greater than the diameter of the cutter so that it will project slightly beyond the cutting edge or working surface of the tool. These guards do not in any way interfere with the application of the tool to the work but they do prevent the ends or corners of the tool from being accidentally depressed into contact with the surface adjacent to the part which is being finished.

The main frame is provided at its respective ends with handles 49 and 50 adapted to be grasped by the operator and used in manipulating the tool. The handles are shown in Fig. 1 as L-shaped in form with their longer portions extending transversely to the main frame and their shorter portions rigidly secured to the respective end members. It is desirable that the handles should be adjustable to different angular positions with relation to the main frame to accommodate the same to the location of the work with relation to the operator. As here shown, the horizontal portion of each handle is provided with a flange 51 having a plurality of bolt holes 52, in the present instance four. The end member is provided adjacent to the flange 51 with a series of holes 53 greater in number than the number of holes in the flange, there being in the present instance twelve of these holes 53. The two series of holes are so arranged that by alining the holes 52 with selected holes 53 and inserting the bolts 54 the handle may be attached to the frame in any desired position.

The electric conductors 55 lead to the motor through a connector 56, of a well known construction, which has a base 57 rigidly mounted on the longitudinal portion of the end member 13. Rigidly secured to the base of the connector and to the end member of the frame is a plate of insulating material 58. Arranged beneath this plate of insulating material and rigidly secured thereto is a switch 59 which controls the operation of the motor. The switch may be of any suitable construction and is not here shown in detail but it comprises an operating member which is here shown as a lever 60 which extends through a slot 61 in the insulating plate 58 and has at its outer end a spherical head 62. A bar 63 is slidably mounted on the main frame and connected with the operating member 60. In the present instance, a portion of this bar is mounted in the connector base 57 and provided with a notch 64 to receive the spherical head of the actuating member 60, so that the longitudinal movement of the bar will actuate the switch. The outer portion of the bar extends into the horizontal portion of the adjacent handle 50 where it is acted upon by a spring 65 which tends to move the same inwardly and thus move the switch to its open position, and interrupt the operation of the motor. The bar is moved outwardly against the action of the spring by an actuating device mounted on the handle 50 and arranged to be manipulated by the hand which grasps that handle. As shown in Fig. 1, this actuating device comprises a lever 66 pivotally mounted at its lower end on the handle, the latter being slotted to receive the same, and having its upper end extending into a circumferential groove 67 in the outer portion of the bar 63. The bar 63 is preferably formed in two parts which are connected one to the other by an interlocking joint 68 to facilitate the assembly of the apparatus.

It is often desirable to suspend the apparatus from a counterweighted element, such as a cable extending about an elevated sheave and connected at one end with the apparatus and at the other end with a counterweight, thus relieving the operator of the major portion of the weight of the apparatus and greatly facilitating the manipulation thereof. To enable this apparatus to be so suspended and freely manipulated it is provided with a suitable supporting device adapted to be connected with the end of a cable, or other suspending means, and which is so connected with the apparatus that the latter may be rocked about a longitudinal axis, to enable the tool to be brought into engagement with and moved over the work. The supporting device preferably includes an eye or the like to which the suspending means may be connected and, as shown in Fig. 1, this eye is connected with the main frame of the apparatus between the ends thereof and the arrangement of the mechanism is such that the apparatus will be substantially balanced about a transverse axis extending through the eye. In order that the apparatus may be rocked about a longitudinal axis, a swiveled connection is interposed between the eye 69 and the main frame. This swiveled support may take various forms but that here shown is highly efficient and may be quickly and easily manufactured and assembled. It comprises an inner ring 70 mounted about and rigidly secured to the motor casing 10 and an outer ring 71 mounted about and supported on the inner ring, the two rings having contacting bearing surfaces which permit the inner ring to rotate freely within the outer ring when the latter is connected with the cable or other counterbalancing element. When the bearing surfaces are flat, as here shown, some means must be provided for preventing the lateral displacement of the two rings and for this purpose the outer ring 71 is provided with an interior circumferential groove 72 and the inner ring has mounted therein a series of studs 73 which project into the groove 72 and have a sliding fit therein. These studs are inserted in the inner ring 70 through radial openings, the heads of the studs being countersunk in the inner surface of the ring. It is, of course, necessary that the two rings be assembled, with the studs in position, before the support is mounted on the motor casing and to enable the inner ring to be rigidly attached to the motor casing, after the assembled support has been mounted on that casing, the inner ring is provided with a series of screw holes 74 in line with the groove 72 in the outer ring, and the outer ring is provided in its outer wall with a hole 75 which opens into the groove 72. By rotating the outer ring on the inner ring to bring the hole 75 into alinement with one of the screw holes 74 the screw 74a may be inserted through the opening 75 and screw hole 74 into the motor casing. The outer ring is shifted to bring the hole 75 successively into line with the several screw holes in the inner ring until all the screws have been inserted, and the opening 75 is then preferably closed. In order to lubricate the bearing surfaces of the two rings the outer ring has mounted therein a lubricating fitting 76 of a well known type and I have utilized the hole in which this fitting is mounted as the screw inserting hole 75. When the screws have all been inserted the fitting is replaced in its hole and serves to prevent access being had to the screws as well as serving its usual purpose as a lubricating element.

If desired, bearing balls may be interposed between the two rings of the support and in Fig. 8 I have illustrated one construction whereby this is conveniently accomplished. As there shown, the outer ring 91 and inner ring 92 are provided with opposed ball races 94 and 95 extending circumferentially thereof and adapted to receive bearing balls 93. This construction is of such a character that the inner ring 92 may be secured to the frame before the outer ring is mounted thereon and the balls inserted. The screw holes in the inner ring, which receive the screws 96 for attaching the ring to the frame, are arranged at one side of the ball race 95 and the two rings have at opposed sides flanges 97 to properly locate the rings with relation one to the other. The opening 98 for the lubricating nipple 99 enters the ball race in the outer ring and is of such a size that the balls may be dropped through the same. Thus in assembling the device the inner ring is first secured to the frame, the outer ring placed in position about the same, the balls dropped through the opening 98 in sufficient number to substantially fill the ball races and the nipple then inserted in the opening 98, thereby completing the assembly of the device, the balls serving to hold the outer ring against lateral displacement with relation to the inner ring.

In some cases it is preferable to connect the supporting device with the ends of the frame instead of with an intermediate part thereof, and in Figs. 6 and 7, I have shown the supporting device as a substantially U-shaped bail 80 the arms of which are arranged at the respective ends of the frame and pivotally connected therewith on a longitudinal axis adjacent to the longitudinal center of gravity of the apparatus as a whole. The arms of the bail may be mounted on the end members of the frame in any suitable manner, as by mounting them on pivot studs or bolts 81 carried by brackets 82 rigidly secured to the respective end members. The transverse portion of the bail is curved and provides an arcuate track extending between the two arms of the bail which receives and is supported by a grooved roller or wheel 89 carried by a hanger 90 which in turn is provided with an eye 83 by means of which it may be connected with a suspending cable or the like. A stop 88 is arranged near each end of the curved portion of the bail to limit the movement of the same with relation to the roller 89 and to prevent the latter from contacting with the frame. Thus when the apparatus is tilted about a transverse axis the bail will travel over the roller 89 and the inclined apparatus will be substantially balanced on the roller so that it will have little tendency to tilt about a transverse axis and may be easily manipulated by the operator and moved about either a longitudinal axis or a transverse axis. As a result the operator can with little or no effort move the apparatus in any direction to a position best adapted to the work to be performed and retain the same in that position.

The handles may be of any suitable character and as shown in Fig. 6 the handle 84 at the left end of the apparatus is L-shaped and is secured at one end only to the frame. The handle 85 at the right hand end of the apparatus is U-shaped and is rigidly secured at both ends to the adjacent frame member. The switch actuating member, which is arranged adjacent to the handle 85, is in the form of a finger piece 86 secured to and supported by the bar 63 which is connected with the movable switch member. This actuating member is arranged to be grasped by the fingers of the hand which grasps the handle 85 and, as here shown, it operates in a slot 87 in that handle.

The construction and operation of the apparatus will be readily understood from the foregoing description and I wish it to be understood that while I have shown and described one embodiment of the invention, and a minor modification thereof, I do not wish to be limited to the details thereof as various modifications may occur to a person skilled in the art.

Having now fully described my invention, what I claim as new and desire to secure by Letters Patent, is:

1. In a power operated portable tool, a frame comprising end members and a casing arranged between and connected with said end members, a motor element rotatably mounted in said casing, bearings carried by said end members in laterally offset relation to said casing, a tool mounted in said bearings, a driving connection between said tool and said motor element, guard rings mounted on said end members adjacent to the respective ends of said tool for rotation about the axis of said tool, said guard rings being of a diameter slightly greater than the diameter of said tool, and handles connected with said frame.

2. In a power operated portable tool, a frame comprising end members and a casing arranged between and connected with said end members, a motor element rotatably mounted in said casing, a tool mounted on said frame alongside of and in laterally offset relation to said casing and rotatable about an axis extending lengthwise of said frame, a driving connection between said motor element and said tool, a chip guard extending partially about said tool, means for securing said guard to said frame in different positions with relation to said tool, and handles connected with said frame.

3. In a power operated portable tool, a frame comprising end members and a casing arranged between and connected with said end members, a motor element rotatably mounted in said casing, a tool mounted on said frame for rotation about an axis extending lengthwise thereof and arranged between said end members in lateral offset relation to said casing, a driving connection between said motor element and said tool, handles at the respective ends of said frame, and means for securing said handles to the respective end members in different positions with relation to said tool.

4. In a power operated portable tool, a frame comprising end members and a casing arranged between and connected with said end members, a motor element rotatably mounted in said casing, a tool mounted on said frame for rotation about an axis extending lengthwise thereof and arranged between said end members in laterally offset relation to said casing, a driving connection between said motor element and said tool, handles secured to the respective ends of said frame, a switch mounted on said frame, a bar slidably mounted on said frame and operatively connected with said switch, and an actuating member supported adjacent to one of said handles and operatively connected with said bar.

5. A swiveled support for the frame of a portable tool or the like comprising an inner ring extending about said frame, an outer ring rotatably mounted on said inner ring, said outer ring having an interior circumferential groove, studs carried by said inner ring and slidably mounted in said groove, and means for securing said inner ring to said frame after said outer ring has been attached thereto.

6. A swiveled support for the frame of a portable tool or the like comprising an inner ring extending about said frame, an outer ring rotatably mounted on said inner ring, said outer ring having an interior circumferential groove, said inner ring having a series of holes registering with said groove in said outer ring, studs extending through said holes into said groove, said inner ring also having screw holes registering with said groove, said outer ring having a hole opening into said groove and adapted to be moved successively into line with the screw holes in said ring to enable screws to be inserted in said screw holes, and means for connecting said outer ring with a supporting device.

7. In a power operated portable tool, a frame comprising a casing and end members secured to the respective ends of said casing and projecting laterally beyond the same, a motor element rotatably mounted in said casing, a tool arranged between and mounted on said end members for rotation about an axis extending lengthwise of said frame, a driving connection between said motor element and said tool, a swinging support for said frame comprising an annulus adapted to be connected with suspending means and extending about and rotatively connected with said casing, and handles connected with the respective end members.

8. In a power operated portable tool, a frame comprising end members and a casing arranged between and connected with said end members, a motor element rotatably mounted in said casing, bearings carried by said end members in laterally offset relation to said casing, a tool mounted in said bearings, a driving connection between said tool and said motor element, guards mounted on said end members between said bearings and the adjacent ends of said tool and projecting beyond the working face of said tool, means for connecting said frame with suspending means for swinging movement transverse to the axis of said tool, and handles connected with the respective end members.

9. In a power operated portable tool, a frame comprising end members and a casing arranged between and connected with said end members, a motor element rotatably mounted in said casing, one of said end members having a laterally offset portion, a gear rotatably mounted in said portion and, a driving connection between said gear and said motor element, the other end member having a laterally offset part detachably secured thereto, a bearing carried by said detachable part, a tool having a shaft detachably connected at one end to said gear and mounted at its other end in said bearing, whereby the removal of the detachable part of said end member will permit said tool to be detached from said gear and removed from said frame, means for connecting said frame with and in substantially balanced relation to a suspending device for swinging movement transverse to the axis of said tool, and handles connected with the respective ends of said frame.

10. A swiveled support for the frame of a portable tool or the like comprising an inner ring secured to and extending about said frame, an outer ring rotatably mounted on said inner ring, said rings having opposed circumferential ball races, bearing balls mounted in said races and serving to hold the said rings against relative axial displacement, the outer ring having a normally closed opening through which said balls may be inserted in said races after said support has been assembled with said races in alinement, and means for connecting the outer ring with a suspending device.

CHARLES W. RIPSCH.